US010584743B2

(12) United States Patent
Shishihara et al.

(10) Patent No.: US 10,584,743 B2
(45) Date of Patent: Mar. 10, 2020

(54) NEEDLE ROLLER THRUST BEARING

(71) Applicant: JTEKT CORPORATION, Osaka-shi, Osaka (JP)

(72) Inventors: Yuki Shishihara, Kashiwara (JP); Shigeo Kamamoto, Kashiwara (JP); Junji Murata, Kashiba (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/426,525

(22) Filed: May 30, 2019

(65) Prior Publication Data

US 2019/0368542 A1 Dec. 5, 2019

(30) Foreign Application Priority Data

Jun. 5, 2018 (JP) ................. 2018-107416

(51) Int. Cl.
*F16C 33/46* (2006.01)
*F16C 19/30* (2006.01)
*F16C 33/38* (2006.01)
*F16C 33/58* (2006.01)
*F16C 35/077* (2006.01)

(52) U.S. Cl.
CPC ........ *F16C 19/305* (2013.01); *F16C 33/3818* (2013.01); *F16C 33/585* (2013.01); *F16C 35/077* (2013.01)

(58) Field of Classification Search
CPC .... F16C 19/30; F16C 19/305; F16C 33/4605; F16C 33/4626; F16C 33/4629; F16C 33/4635; F16C 33/4676
See application file for complete search history.

(56) References Cited

U.S. PATENT DOCUMENTS 6,106,158 A * 8/2000 Hayashi .................. F16C 19/30
384/621
7,942,586 B2 * 5/2011 Tamada .............. F04B 27/1063
384/448

FOREIGN PATENT DOCUMENTS

JP         2011012754 A  *  1/2011  ............ F16C 33/543
JP         2016-200266 A      12/2016
WO    WO-2009068376 A1 *  6/2009  .............. F16C 19/30

* cited by examiner

*Primary Examiner* — Phillip A Johnson
(74) *Attorney, Agent, or Firm* — Oliff PLC (57) ABSTRACT

A bearing includes a cage and rollers disposed between a first raceway surface and a second raceway surface axially facing each other. The cage includes a first guide surface and a second guide surface. The first guide surface is provided on a radially outer portion of the cage, and contacts the first raceway surface when the cage is displaced toward the first raceway surface. A clearance formed between the first guide surface and the first raceway surface is smaller than a clearance at a radially inner portion of the cage. The second guide surface is provided on a radially outer portion of the cage, and contacts the second raceway surface when the cage is displaced toward the second raceway surface. A clearance formed between the second guide surface and the second raceway surface is smaller than a clearance at a radially inner portion of the cage.

6 Claims, 5 Drawing Sheets

NEEDLE ROLLER THRUST BEARING

INCORPORATION BY REFERENCE

The disclosure of Japanese Patent Application No. 2018-107416 filed on Jun. 5, 2018 including the specification, drawings and abstract, is incorporated herein by reference in its entirety.

BACKGROUND OF THE INVENTION

1. Field of the Invention

The invention relates to a needle roller thrust bearing.

2. Description of Related Art

Needle roller thrust bearings having a high load-carrying capacity and adaptable to high-speed rotation are widely used in various devices, such as transmissions of automobiles and construction equipment. A needle roller thrust bearing includes an annular cage having a plurality of cage pockets that is radially disposed, and a plurality of rollers housed in the cage pockets. The plurality of rollers is disposed between a first raceway surface and a second raceway surface that axially face each other. Each of the rollers rolls on the first raceway surface and the second raceway surface as the needle roller thrust bearing rotates. Such a needle roller thrust bearing is disclosed in Japanese Patent Application Publication No. 2016-200266 (JP 2016-200266 A).

One factor of rolling resistance of such a needle roller thrust bearing is sliding friction resistance between components. An example of the sliding friction resistance is sliding friction resistance caused by sliding between the rollers and the raceway surfaces. More specifically, in the needle roller thrust bearing, the rollers are housed in the cage pockets that are radially disposed. When the needle roller thrust bearing rotates, a running distance of the rollers varies between a radially inner position and a radially outer position. This causes the rotating rollers to slide on the raceway surfaces. This sliding generates a resistance. Other factors causing the sliding friction resistance may include sliding between the rollers and the cage in contact and sliding between the cage and a bearing ring in contact.

To increase rolling efficiency, or, in other words, to reduce rolling loss, of such a device as those described above, it has been desired to lower frictional torque (reduce rolling resistance) of the needle roller thrust bearing in recent years.

SUMMARY OF THE INVENTION

An object of the invention is to reduce sliding friction resistance that is a factor of rolling resistance in a needle roller thrust bearing.

According to an aspect of the invention, a needle roller thrust bearing includes an annular cage having a plurality of cage pockets that is radially disposed, and a plurality of rollers housed in the cage pockets and disposed between a first raceway surface and a second raceway surface that axially face each other. The cage and the rollers are provided in an annular space defined between the first raceway surface and the second raceway surface such that lubricating oil flows in the annular space from a radially inner side to a radially outer side. The cage includes a first guide surface and a second guide surface. The first guide surface is provided on a radially outer portion of the cage, and contacts the first raceway surface when the cage is displaced toward the first raceway surface. A clearance that is formed between the first guide surface and the first raceway surface is smaller than a clearance at a radially inner portion of the cage. The second guide surface is provided on a radially outer portion of the cage, and contacts the second raceway surface when the cage is displaced toward the second raceway surface. A clearance that is formed between the second guide surface and the second raceway surface is smaller than a clearance at a radially inner portion of the cage.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
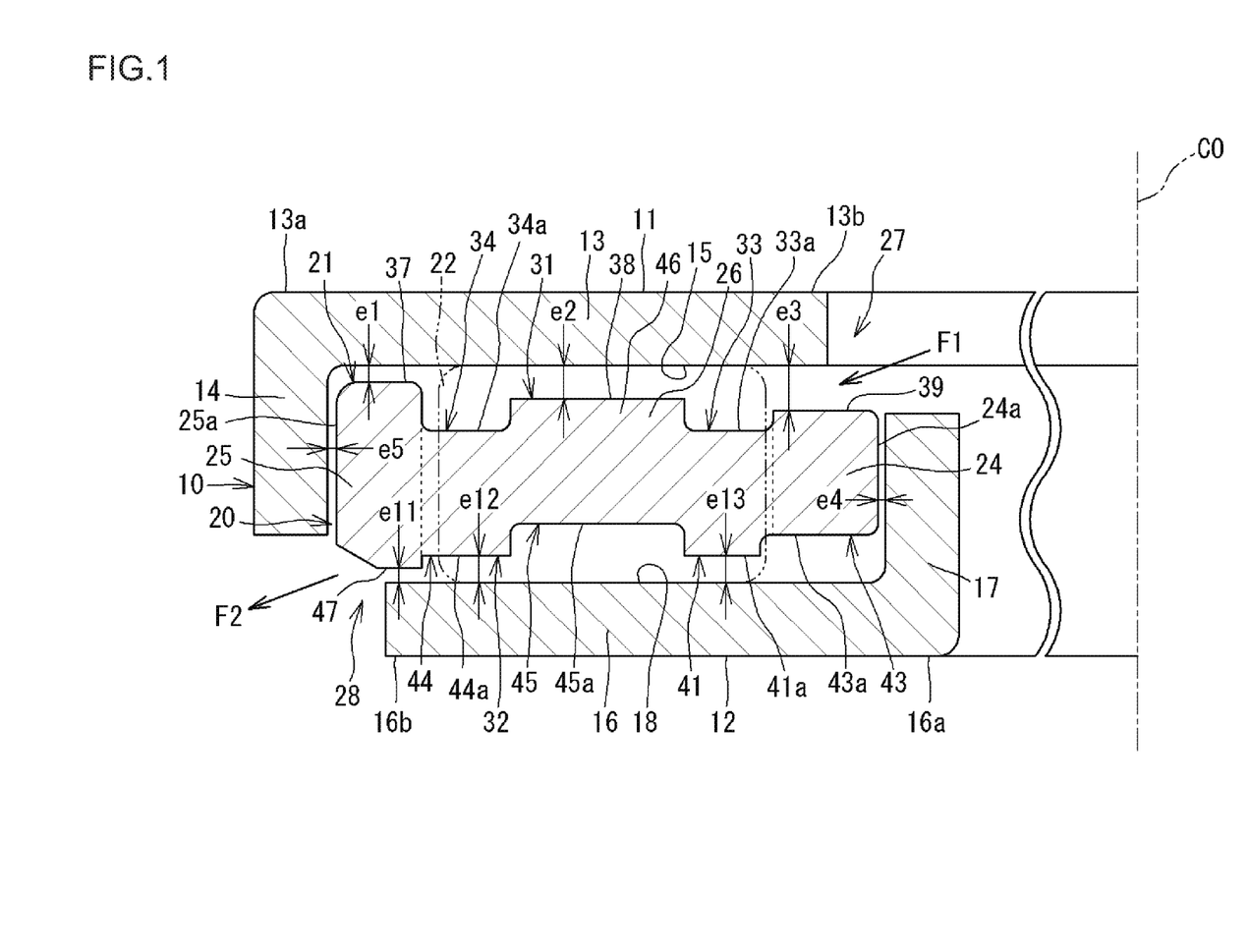
FIG. 1 is a sectional view illustrating a needle roller thrust bearing according to an embodiment of the invention.

FIG. 1 is a sectional view illustrating a needle roller thrust bearing 10 according to an embodiment of the invention. The needle roller thrust bearing 10 (hereinafter sometimes simply referred to as the bearing 10) is used in a transmission of an automobile, for example. Lubricating oil is stored in a housing included in the transmission, and used for lubrication of the bearing 10.

Figure 2:
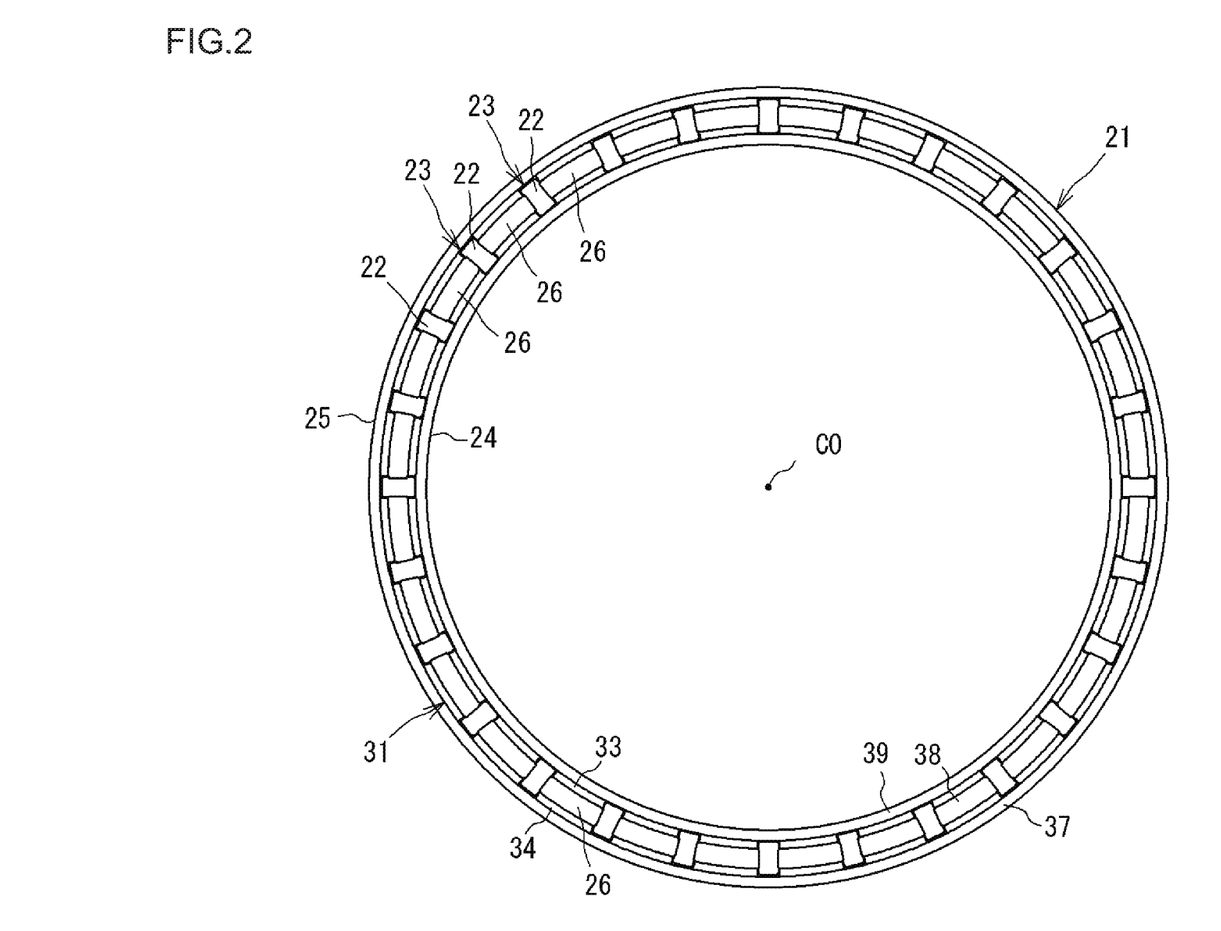
FIG. 2 is a diagram illustrating a cage and a plurality of rollers as viewed along a central axis of the cage.

The bearing 10 includes an annular cage 21 and a plurality of rollers 22. FIG. 2 is a diagram illustrating the cage 21 and the plurality of rollers 22 as viewed along a central axis C0 of the cage 21. Hereinafter, a direction along the central axis C0 of the cage 21 is an axial direction of the cage 21, and the term "axial" or "axially" refers to the axial direction thereof. Note that the axial direction includes directions parallel to the central axis C0. A direction orthogonal to the central axis C0 is a radial direction of the cage 21, and the term "radial" or "radially" refers to the radial direction thereof. A circumferential direction about the central axis C0 is a circumferential direction of the cage 21, and the term "circumferential" or "circumferentially" refers to the circumferential direction thereof. In the following description, it is assumed that the central axis C0 of the cage 21 coincides with a central axis of the bearing 10.

The bearing 10 according to the embodiment includes an annular first bearing ring 11 located on one side (upper side in FIG. 1) in the axial direction (hereinafter referred to as a first axial side) and an annular second bearing ring 12 located on the other side (lower side in FIG. 1) in the axial direction (hereinafter referred to as a second axial side). The first bearing ring 11 includes a ring-shaped first body portion 13 and a short-cylinder-shaped first rib portion 14. The first rib portion 14 extends toward the second axial side from a radially outer end portion 13a (left side in FIG. 1) of the first body portion 13. A flat, ring-shaped first raceway surface 15 is formed on the second axial side of the first body portion 13. The second bearing ring 12 includes a ring-shaped second body portion 16 and a short-cylinder-shaped second rib portion 17. The second rib portion 17 extends toward the first axial side from a radially inner end portion 16a (right side in FIG. 1) of the second body portion 16. A flat, ring-shaped second raceway surface 18 is formed on the first axial side of the second body portion 16. The cage 21 and the rollers 22 are disposed between the first bearing ring 11 and the second bearing ring 12. The rollers 22 roll on the first raceway surface 15 and the second raceway surface 18 as the bearing 10 rotates.

The first bearing ring 11 and the second bearing ring 12 may be omitted from the bearing 10. Although not illustrated, in this case, a first member included in a device that includes the bearing 10 serves as the first bearing ring 11, and a second member included in the device serves as the second bearing ring 12. The ring-shaped first raceway surface 15 is formed on the first member. The ring-shaped second raceway surface 18 is formed on the second member. Even when the first bearing ring 11 and the second bearing ring 12 are omitted, a member corresponding to at least one of the first rib portion 14 and the second rib portion 17 is provided to reduce detachment of the cage 21 that holds the rollers 22 in the radial direction.

As illustrated in FIG. 2, the cage 21 has a plurality of cage pockets 23. The cage pockets 23 are disposed radially about the central axis C0. The cage 21 includes an inner annular portion 24 located in a radially inner portion of the cage 21, an outer annular portion 25 located in a radially outer portion of the cage 21, and a plurality of cage bars 26 that connects the inner annular portion 24 and the outer annular portion 25. Each space between a circumferentially adjacent pair of the cage bars 26 and 26 in a region between the inner annular portion 24 and the outer annular portion 25 serves as each of the cage pockets 23.

The rollers 22 are cylindrical and referred to as cylindrical rollers. Each of the cage pockets 23 houses one of the rollers 22. Central axes of the rollers 22 are disposed on imaginary lines extending along the radial directions from the central axis C0 of the cage 21. As illustrated in FIG. 1, the plurality of rollers 22 is disposed between the first raceway surface 15 and the second raceway surface 18 that axially face each other. Although the rollers 22 do not actually overlap the cage bars 26, for clarity of description, the roller 22 is indicated by a long dashed double-short dashed line (hidden line) in FIG. 1 such that the roller 22 overlaps the cage bar 26.

An annular space 20 is defined between the first raceway surface 15 (of the first bearing ring 11) and the second raceway surface 18 (of the second bearing ring 12). The cage 21 and the rollers 22 are disposed in the annular space 20. As the bearing 10 rotates, a centrifugal force causes lubricating oil around (an inner circumference of) the bearing 10 to flow in the annular space 20 from a radially inner side to a radially outer side. In FIG. 1, the lubricating oil flows from right to left. An opening 27 is defined between a radially inner end portion 13b of the first bearing ring 11 and the second rib portion 17 of the second bearing ring 12. The lubricating oil flows into the annular space 20 through the opening 27. An opening 28 is defined between a radially outer end portion 16b of the second bearing ring 12 and the first rib portion 14 of the first bearing ring 11. The lubricating oil flows out of the annular space 20 through the opening 28. In FIG. 1, flow of the lubricating oil flowing into the annular space 20 through the opening 27 is indicated by an arrow F1, and flow of the lubricating oil flowing out of the annular space 20 through the opening 28 to the outside of the bearing 10 is indicated by an arrow F2.

The rollers 22, the first bearing ring 11, and the second bearing ring 12 are made of steel. Although the cage 21 may be made of metal (made of steel), in the embodiment, the cage 21 is made of plastic to reduce sliding friction resistance.

Figure 3:
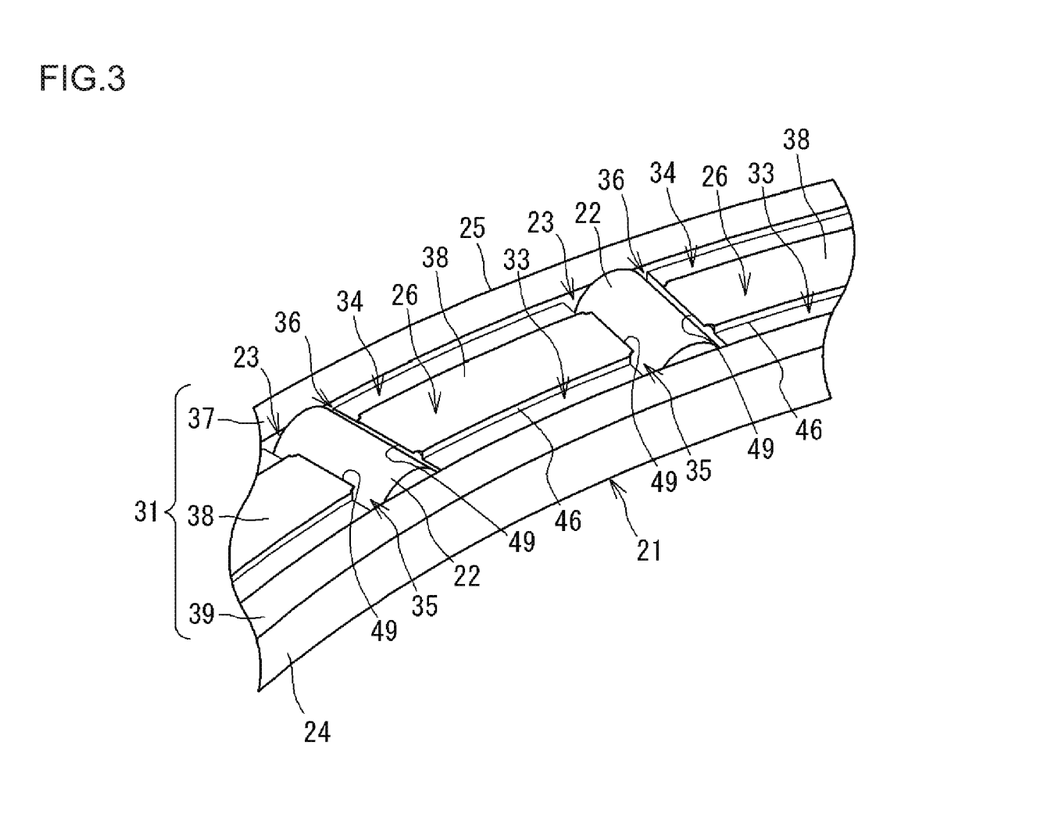
FIG. 3 is a perspective partial view of the cage, illustrating a side on which a first side surface is provided.

The cage 21 includes a first side surface 31 that is a side surface facing the first raceway surface 15 and a second side surface 32 that is a side surface facing the second raceway surface 18. In FIG. 1, each of a boundary between the cage bar 26 and the outer annular portion 25 and a boundary between the cage bar 26 and the inner annular portion 24 is indicated by a dashed line. FIG. 3 is a perspective partial view of the cage 21, illustrating a side on which the first side surface 31 is provided (hereinafter referred to as the first side surface 31 side). First inner grooves 33 (hereinafter sometimes simply referred to as the inner grooves 33) and first outer grooves 34 (hereinafter sometimes simply referred to as the outer grooves 34) are provided in the first side surface 31. The inner grooves 33 and the outer grooves 34 are provided individually to each of the plurality of cage bars 26.

The inner grooves 33 are provided in a radially inner portion of the first side surface 31. The outer grooves 34 are provided in a radially outer portion of the first side surface 31. Each of the inner grooves 33 connects a circumferentially adjacent pair of the cage pockets 23 and 23 and, more particularly, connects radially inner areas 35 (the areas 35 close to the inner annular portion 24) of the pair of cage pockets 23. Each of the inner grooves 33 is open at its opposite circumferential ends to the cage pockets 23. Each of the outer grooves 34 connects a circumferentially adjacent pair of the cage pockets 23 and 23 and, more particularly, connects radially outer areas 36 (the areas 36 close to the outer annular portion 25) of the pair of cage pockets 23. Each of the outer grooves 34 is open at its opposite circumferential ends to the cage pockets 23.

The first side surface 31 includes a first guide surface 37, middle surfaces 38, and an inner side surface 39 arranged in this sequence toward a radially inner end of the first side surface 31. The outer grooves 34 are provided between the first guide surface 37 and the middle surfaces 38. The inner grooves 33 are provided between the middle surfaces 38 and the inner side surface 39. The first guide surface 37 is a surface on a radially outer portion of the first side surface 31. The first guide surface 37 is an annular side surface on the first axial side of the outer annular portion 25. The inner side surface 39 is a surface on a radially inner portion of the first side surface 31. The inner side surface 39 is an annular side surface on the first axial side of the inner annular portion 24. The middle surfaces 38 are surfaces on a radially middle portion of the first side surface 31. Each of the middle surfaces 38 is a part of an arcuate side surface on the first axial side of one of the cage bars 26.

As illustrated in FIG. 1, an axial clearance e1 is provided between the first guide surface 37 and the first raceway surface 15. Other axial clearances are also provided between the first raceway surface 15 and the surfaces of the first side surface 31 other than the first guide surface 37. More specifically, an axial clearance e2 is provided between the middle surfaces 38 and the first raceway surface 15. An axial clearance e3 is provided between the inner side surface 39 and the first raceway surface 15. The clearance e1 at the first guide surface 37 is smaller than the clearances (e2 and e3) at radially inner surfaces (the middle surfaces 38 and the inner side surface 39) of the first side surface 31 other than the first guide surface 37. The clearance e2 between the middle surfaces 38 and the first raceway surface 15 is smaller than the clearance e3 between the inner side surface 39 and the first raceway surface 15. Thus, a distance (clearance) between the first side surface 31 and the first raceway surface 15 is structured such that the distance is the largest at the inner side surface 39, followed by the middle surfaces 38 and the first guide surface 37. Groove bottom surfaces 33a of the inner grooves 33 and groove bottom surfaces 34a of the outer grooves 34 are further away from the first raceway surface 15 than the inner side surface 39 is.

When the cage 21 is displaced toward the first raceway surface 15 along the central axis C0 of the cage 21, the first guide surface 37 contacts the first raceway surface 15. By contrast, even when the cage 21 is displaced as described above, the middle surfaces 38 and the inner side surface 39 do not contact the first raceway surface 15 (remain non-contact).

Figure 4:
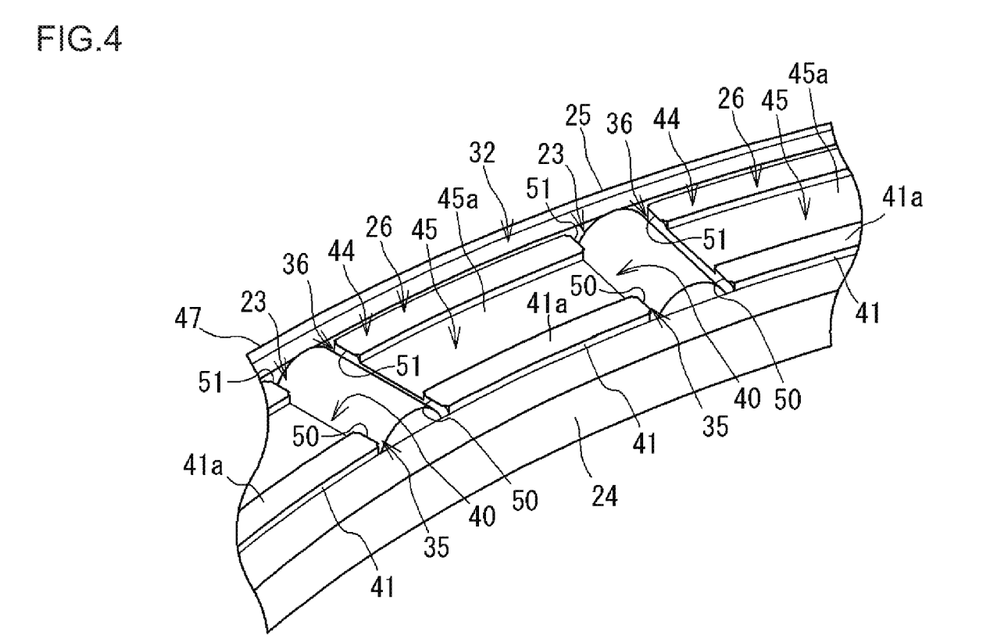
FIG. 4 is a perspective partial view of the cage, illustrating a side on which a second side surface is provided.

FIG. 4 is a perspective partial view of the cage 21, illustrating a side on which the second side surface 32 is provided (hereinafter referred to as the second side surface 32 side). A second inner groove 43 (hereinafter sometimes simply referred to as the inner groove 43), middle grooves 45, and second outer grooves 44 (hereinafter sometimes simply referred to as the outer grooves 44) are provided in the second side surface 32. The inner groove 43 is provided in the inner annular portion 24. The middle grooves 45 and the outer grooves 44 are provided individually in the respective cage bars 26.

The inner groove 43 is provided in a radially inner portion of the second side surface 32. The outer grooves 44 are provided in a radially outer portion of the second side surface 32. The middle grooves 45 are provided in an area between the inner groove 43 and the outer grooves 44 of the second side surface 32. As illustrated in FIG. 1, raised portions 41 are provided between the inner groove 43 and the middle grooves 45. The raised portions 41 are raised to be closer to the second raceway surface 18 than a groove bottom surface 43a of the inner groove 43 and groove bottom surfaces 45a of the middle grooves 45 are. The raised portions 41 include raised surfaces 41a that are surfaces facing the second raceway surface 18.

The inner groove 43 is provided between the raised portions 41 and the second rib portion 17 of the second bearing ring 12. Each of the middle grooves 45 connects a circumferentially adjacent pair of the cage pockets 23 and 23 and, more particularly, connects radially middle areas 40 of the pair of cage pockets 23. Each of the middle grooves 45 is open at its opposite circumferential ends to the cage pockets 23. Each of the outer grooves 44 connects a circumferentially adjacent pair of the cage pockets 23 and 23 and, more particularly, connects the radially outer areas 36 (the areas 36 close to the outer annular portion 25) of the pair of cage pockets 23. Each of the outer grooves 44 is open at its opposite circumferential ends to the cage pockets 23. The outer grooves 44 and the middle grooves 45 are located on a radially outer side and a radially inner side, respectively, adjacent to each other. The middle grooves 45 are provided such that the groove bottom surfaces 45a are deeper than the outer grooves 44. More specifically, the groove bottom surfaces 45a of the middle grooves 45 are further away from the second raceway surface 18 than groove bottom surfaces 44a of the outer grooves 44 are.

The second side surface 32 includes a second guide surface 47 on its radially outer portion. The second guide surface 47 is an annular side surface on the second axial side of the outer annular portion 25. As illustrated in FIG. 1, an axial clearance e11 is provided between the second guide surface 47 and the second raceway surface 18. Other axial clearances are also provided between the second raceway surface 18 and the surfaces of the second side surface 32 other than the second guide surface 47. More specifically, an axial clearance e12 is provided between the groove bottom surfaces 44a and the second raceway surface 18. An axial clearance e13 is provided between the raised surfaces 41a and the second raceway surface 18. The clearance e11 at the second guide surface 47 is smaller than the clearances (e12 and e13) at radially inner surfaces (e.g., the groove bottom surfaces 44a and the raised surfaces 41a) of the second side surface 32 other than the second guide surface 47.

When the cage 21 is displaced toward the second raceway surface 18 along the central axis C0 of the cage 21, the second guide surface 47 contacts the second raceway surface 18. By contrast, even when the cage 21 is displaced as described above, the other surfaces (e.g., the groove bottom surfaces 45a and the raised surfaces 41a) of the second side surface 32 do not contact the second raceway surface 18 (remain non-contact).

Figure 5:
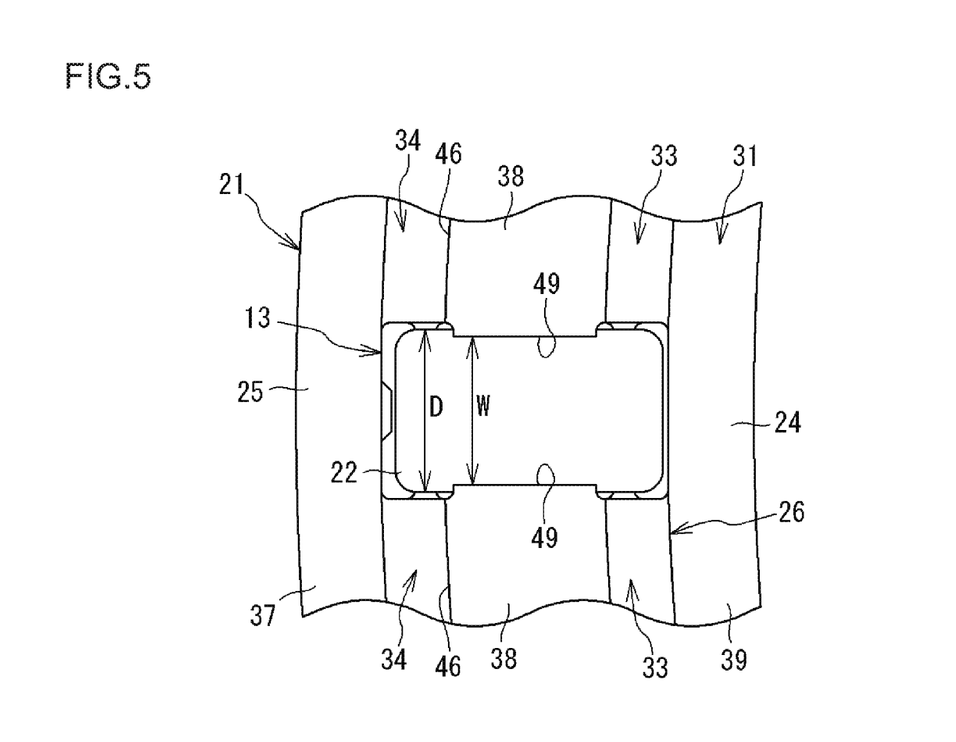
FIG. 5 is a partial view of the cage as viewed from the side on which the first side surface is provided.

The cage 21 is structured to reduce detachment of the rollers 22 housed in the cage pockets 23. For this purpose, as illustrated in FIG. 3, tabs 49 that reduce detachment of the rollers 22 are provided on the cage 21 on opposite circumferential ends of middle portions 46 on which the middle surfaces 38 are formed. The tabs 49 project toward the roller 22 held in the cage pocket 23. As illustrated in FIG. 5, a distance W between the tabs 49 and 49 circumferentially sandwiching the cage pocket 23 is smaller than a diameter D of the roller 22 (W<D). Hence, detachment of the roller 22 from the cage pocket 23 is reduced. As illustrated in FIG. 4, tabs 50 that reduce detachment of the rollers 22 are provided on opposite circumferential ends of the raised portions 41 of the cage 21. Furthermore, tabs 51 that reduce detachment of the rollers 22 are provided on opposite circumferential ends of (the groove bottom surfaces 44a of) the outer grooves 44. The tabs 50 and 51 project toward the roller 22 held in the cage pocket 23. A distance between the tabs 50 and 50 circumferentially sandwiching the cage pocket 23 is smaller than the diameter D of the roller 22. A distance between the tabs 51 and 51 circumferentially sandwiching the cage pocket 23 is smaller than the diameter D of the roller 22. Hence, detachment of the roller 22 from the cage pocket 23 is reduced. The tabs 49 (or the tabs 50 and 51) are deformed when the roller 22 is housed in the cage pocket 23.

The tabs 49, 50, and 51 function as anti-detachment portions for the rollers 22 in a state in which a unit configured of the cage 21 and the rollers 22 is separated from the first bearing ring 11 and the second bearing ring 12. The tabs 49, 50, and 51 function as the anti-detachment portions for the rollers 22 when the unit configured of the cage 21 and the rollers 22 is assembled to a position between (the first raceway surface 15 of) the first bearing ring 11 and (the second raceway surface 18 of) the second bearing ring 12, for example.

The tabs 49, 50, and 51 do not function in a state illustrated in FIG. 1 or, in other words, in a finished state in which the unit configured of the cage 21 and the rollers 22 is assembled to the position between the first raceway surface 15 and the second raceway surface 18. More specifically, in the finished state, any of the tabs 49, 50, and 51 does not contact the rollers 22 even when the cage 21 is axially displaced. In the finished state, when the cage 21 is axially displaced, either the first guide surface 37 or the second guide surface 47 contacts a corresponding one of the first raceway surface 15 and the second raceway surface 18 before the tabs 49 or the tabs 50 and 51 contact the rollers 22. Thus, the first raceway surface 15 and the second raceway surface 18 axially position the cage 21.

Any one of the first rib portion 14 and the second rib portion 17 radially positions the cage 21. In the embodiment, the second rib portion 17 radially positions the cage 21. To achieve this (see FIG. 1), a clearance e4 provided between an inner circumferential surface 24a of the inner annular portion 24 and the second rib portion 17 is smaller than a clearance e5 between an outer circumferential surface 25a of the outer annular portion 25 and the first rib portion 14 (e4<e5). When the cage 21 is radially displaced, the inner circumferential surface 24a of the inner annular portion 24 contacts the second rib portion 17, thus limiting displacement of the cage 21. In the cage 21, a peripheral speed at a position closer to the inner circumferential surface 24a is smaller than a peripheral speed at a position closer to the outer circumferential surface 25a. Hence, it is more preferable that the cage 21 be guided by the second rib portion 17 than by the first rib portion 14 in view of seizure resistance, for example.

As described above, the bearing 10 according to the embodiment includes the annular cage 21 having the plurality of cage pockets 23 that is radially disposed, and the plurality of rollers 22 housed in the cage pockets 23. The plurality of rollers 22 is disposed between the first raceway surface 15 and the second raceway surface 18 that axially face each other. The cage 21 includes the first guide surface 37 and the second guide surface 47. The first guide surface 37 is provided on a radially outer portion of the cage 21 and has a clearance from the first raceway surface 15 that is smaller than a clearance at a radially inner portion of the cage 21. When the cage 21 is displaced toward the first raceway surface 15, the first guide surface 37 contacts the first raceway surface 15. The second guide surface 47 is provided on a radially outer portion of the cage 21 and has a clearance from the second raceway surface 18 that is smaller than a clearance at a radially inner portion of the cage 21. When the cage 21 is displaced toward the second raceway surface 18, the second guide surface 47 contacts the second raceway surface 18.

As the bearing 10 rotates, lubricating oil flows in the annular space 20 from the radially inner side to the radially outer side. More specifically, the lubricating oil flows from a radially inner portion serving as a lubricating-oil entrance (inlet) portion of the annular space 20 to a radially outer portion serving as a lubricating-oil exit (outlet) portion of the annular space 20. In the bearing 10 configured as described above, both the clearance e1 between the first guide surface 37 and the first raceway surface 15 and the clearance e11 between the second guide surface 47 and the second raceway surface 18 are small at the radially outer portion serving as the exit portion. Hence, each of the clearance e1 and the clearance e11 functions as a restrictor and restricts flow of lubricating oil at the exit portion. Even in an environment in which an amount of lubricating oil around (an inner circumference of) the bearing 10 is small, when the lubricating oil enters the annular space 20, the lubricating oil can remain around the rollers 22 and the cage 21 in the annular space 20. The lubricating oil enables reducing sliding friction resistance in the bearing 10. The bearing 10 can thus achieve a lower frictional torque and increase rolling efficiency or, in other words, reduce rolling loss, of a device that uses the bearing 10. Reducing sliding friction resistance in the bearing 10 enables suppressing temperature rise.

As illustrated in FIG. 1 and FIG. 3, according to the embodiment, the cage 21 has the inner grooves 33. Each of the inner grooves 33 connects a circumferentially adjacent pair of the cage pockets 23 and 23 by connecting the radially inner areas 35 of the pair of cage pockets 23. This configuration causes lubricating oil that flows into the annular space 20 through the radially inner opening 27 (see FIG. 1) and then enters the inner groove 33 to flow along the inner groove 33 to be supplied to the roller 22 held in the cage pocket 23. This especially enables reducing sliding friction resistance between the rollers 22 and the cage pockets 23, between the rollers 22 and the first raceway surface 15, and between the rollers 22 and the second raceway surface 18. The inner grooves 33 thus function as guide grooves that guide the lubricating oil to the cage pockets 23 and the rollers 22.

The lubricating oil that flows into the annular space 20 through the opening 27 can pass through a space between the cage 21 and the second rib portion 17 and flow to the second side surface 32 side of the cage 21. On the second side surface 32 side, the inner groove 43 and the middle grooves 45 function as guide grooves that guide the lubricating oil on the second side surface 32 side to the cage pockets 23 and the rollers 22.

As illustrated in FIG. 1 and FIG. 3, the cage 21 has the outer grooves 34. Each of the outer grooves 34 connects a circumferentially adjacent pair of the cage pockets 23 and 23 by connecting the radially outer areas 36 of the pair of cage pockets 23. This configuration causes lubricating oil inhibited from flowing in the radially outer portion serving as the lubricating-oil exit portion or, more specifically, in a space between the first guide surface 37 and the first raceway surface 15, to be accumulated in the outer grooves 34. The lubricating oil is supplied especially to the space between the first guide surface 37 and the first raceway surface 15. This enables reducing occurrence of lubricating oil shortage in the space. The outer grooves 34 thus function as retention grooves that retain lubricating oil.

The outer grooves that function as the retention grooves are provided both in the first side surface 31 (see FIG. 3) and in the second side surface 32 (see FIG. 4) such that the outer grooves 34 are provided in the first side surface 31 and the outer grooves 44 are provided in the second side surface 32. Hence, lubricating oil is supplied from the outer grooves 34 in the first side surface 31 and from the outer grooves 44 in the second side surface 32 to the space between the first guide surface 37 and the first raceway surface 15 and to a space between the second guide surface 47 and the second raceway surface 18. This enables reducing occurrence of lubricating oil shortage on both the first guide surface 37 and the second guide surface 47.

According to the embodiment, both the inner grooves 33 and the outer grooves 34 are provided on the first side surface 31 side. This causes lubricating oil that flows into the annular space 20 through the radially inner opening 27 (see FIG. 1) to be supplied to the cage pockets 23 and the rollers 22 through the inner grooves 33 and, thereafter, flow radially outward along the cage pockets 23 and the rollers 22. The lubricating oil is then accumulated in the outer grooves 34.

As illustrated in FIG. 1, the first side surface 31 includes the first guide surface 37, the middle surfaces 38, and the inner side surface 39 arranged in this sequence from the radially outer end toward the radially inner end of the first side surface 31. The distance between the first side surface 31 and the first raceway surface 15 is structured such that the distance at the inner side surface 39 is the largest, followed by the middle surfaces 38 and the first guide surface 37. In this configuration, the clearance e3 between the inner side surface 39 and the first raceway surface 15 is relatively large.

This facilitates entry of lubricating oil into a space between the first raceway surface 15 and the first side surface 31 through the radially inner opening 27. The clearance e2 between the middle surfaces 38 and the first raceway surface 15 is slightly smaller (as compared with the clearance e1). This configuration suppresses flow of lubricating oil from the radially inner side toward the radially outer side. By contrast, the inner grooves 33 enhance circumferential flow (more specifically, flow toward the cage pockets 23 and the rollers 22) of the lubricating oil. The clearance e1 between the first guide surface 37 and the first raceway surface 15 is the smallest among the clearances and inhibits flow of the lubricating oil, causing the lubricating oil to accumulate.

As illustrated in FIG. 1, the clearance between the first raceway surface 15 and the first side surface 31, other than the first guide surface 37 varies along the radial direction. In other words, the first side surface 31 has an uneven sectional profile. The clearance that varies along the radial direction as described above enhances a function of inhibiting flow of lubricating oil in the space between the first raceway surface 15 and the first side surface 31 from the radially inner side toward the radially outer side. The second side surface 32 also has a function similar to the function of the first side surface 31. More specifically, the clearance between the second raceway surface 18 and the second side surface 32 other than the second guide surface 47 varies along the radial direction. This enhances a function of inhibiting flow of lubricating oil from the radially inner side to the radially outer side in a space between the second raceway surface 18 and the second side surface 32.

On the first side surface 31 side, as described above, the clearance e2 between the middle surfaces 38 and the first raceway surface 15 is small (smaller than the clearance e3) but is larger than the clearance e1. The tabs 49 that reduce detachment of the rollers 22 are provided on the middle portions 46 on which the middle surfaces 38 are formed (see FIG. 3). It is necessary to deform the tabs 49 when the rollers 22 are housed in the cage pockets 23 as described above. At this time, not only elastic deformation but also plastic deformation may locally occur at and around one or more of the tabs 49. Furthermore, the plastic deformation may cause protrusion toward the first raceway surface 15. In view of the above, according to the embodiment, the clearance e2 between the middle surfaces 38 and the first raceway surface 15 is larger than the clearance e1 as described above. Even when the plastic deformation occurs so as to cause protrusion toward the first raceway surface 15, the configuration in which the first guide surface 37, rather than the middle portions 46 (the middle surfaces 38, the tabs 49), is brought into contact with the first raceway surface 15 is maintained.

On the side on which the second raceway surface 18 is provided (see FIG. 1), the axial clearance e12 between the groove bottom surfaces 44a and the second raceway surface 18 and the axial clearance e13 between the raised surfaces 41a and the second raceway surface 18 are larger than the clearance e11. The tabs 50 and the tabs 51 that reduce detachment of the rollers 22 are provided on the raised portions 41 and (the groove bottom surfaces 44a of) the outer grooves 44, respectively (see FIG. 4). The clearance e12 and the clearance e13 are relatively large. Even when plastic deformation occurs so as to cause protrusion toward the second raceway surface 18 at and around one or more of the tabs 50 and 51, the configuration in which the second guide surface 47, rather than the outer grooves 44 and the raised portions 41, is brought into contact with the second raceway surface 18 is maintained.

The embodiment describes an example in which the first side surface 31 has both the inner grooves 33 and the outer grooves 34. Alternatively, the first side surface 31 may have only either the inner grooves 33 or the outer grooves 34. The embodiment describes an example in which the inner grooves 43, the middle grooves 45, and the outer grooves 44 are provided in the second side surface 32. Alternatively, any one of the grooves 43, 44, and 45 may be omitted from the second side surface 32.

The disclosed embodiments are in every aspect illustrative and not restrictive. It should be understood that the scope of the invention is not limited to the embodiments described above and encompasses all modifications within the scope of the appended claims and equivalents thereof.

According to the invention, sliding friction resistance in a needle roller thrust bearing can be reduced.

What is claimed is:

1. A needle roller thrust bearing comprising:
   an annular cage having a plurality of cage pockets that is radially disposed; and
   a plurality of rollers housed in the cage pockets and disposed between a first raceway surface and a second raceway surface that axially face each other,
   the cage and the rollers being provided in an annular space defined between the first raceway surface and the second raceway surface such that lubricating oil flows in the annular space from a radially inner side to a radially outer side, wherein
   the cage includes
     a first guide surface that is provided on a radially outer portion of the cage and contacts the first raceway surface when the cage is displaced toward the first raceway surface, a clearance that is formed between the first guide surface and the first raceway surface being smaller than a clearance at a radially inner portion of the cage, and
     a second guide surface that is provided on a radially outer portion of the cage and contacts the second raceway surface when the cage is displaced toward the second raceway surface, a clearance that is formed between the second guide surface and the second raceway surface being smaller than a clearance at a radially inner portion of the cage.

2. The needle roller thrust bearing according to claim 1, wherein the cage has inner grooves, each of the inner grooves connecting a circumferentially adjacent pair of the cage pockets by connecting radially inner areas of the pair of cage pockets.

3. The needle roller thrust bearing according to claim 1, wherein the cage has outer grooves, each of the outer grooves connecting a circumferentially adjacent pair of the cage pockets by connecting radially out areas of the pair of cage pockets.

4. The needle roller thrust bearing according to claim 3, wherein the outer grooves are provided both in a first side surface facing the first raceway surface and in a second side surface facing the second raceway surface.

5. The needle roller thrust bearing according to claim 1, wherein
   the first side surface of the cage facing the first raceway surface includes the first guide surface, middle surfaces, and an inner side surface arranged in sequence from the radially outer side to the radially inner side, and
   a distance between the first side surface and the first raceway surface is structured such that the distance at the inner side surface is the largest, followed by the middle surfaces and the first guide surface.

6. The needle roller thrust bearing according to claim 5, wherein tabs that reduce detachment of the rollers are provided on middle portions, on which the middle surfaces are formed, of the cage.

\* \* \* \* \*